(12) United States Patent
Kambe et al.

(10) Patent No.: US 8,829,345 B2
(45) Date of Patent: Sep. 9, 2014

(54) COVERED CONDUCTOR FOR WIRE HARNESS AND WIRE HARNESS PRODUCED USING THE SAME

(75) Inventors: Makoto Kambe, Susono (JP); Hideki Katou, Susono (JP)

(73) Assignee: Yazaki Corporation, Tokyo (JP)

( * ) Notice: Subject to any disclaimer, the term of this patent is extended or adjusted under 35 U.S.C. 154(b) by 441 days.

(21) Appl. No.: 12/996,876

(22) PCT Filed: Jun. 9, 2009

(86) PCT No.: PCT/JP2009/060557
§ 371 (c)(1),
(2), (4) Date: Dec. 8, 2010

(87) PCT Pub. No.: WO2009/151063
PCT Pub. Date: Dec. 17, 2009

(65) Prior Publication Data
US 2011/0094769 A1    Apr. 28, 2011

(30) Foreign Application Priority Data

Jun. 9, 2008   (JP) .................................. 2008-150579

(51) Int. Cl.
| | | |
|---|---|---|
| H01B 7/00 | (2006.01) |
| H01B 7/18 | (2006.01) |
| H01B 7/295 | (2006.01) |
| H01B 3/30 | (2006.01) |
| C08L 23/06 | (2006.01) |
| C08L 23/10 | (2006.01) |
| C08L 23/14 | (2006.01) |

(52) U.S. Cl.
CPC ................. *H01B 7/295* (2013.01); *C08L 23/06* (2013.01); *C08L 23/10* (2013.01); *C08L 23/142* (2013.01); *C08L 2205/02* (2013.01)
USPC   174/72 A; 174/107; 174/110 R; 174/110 SR; 174/113 R; 174/120 R

(58) Field of Classification Search
USPC ...... 174/72 A, 110 R, 110 SR, 113 R, 120 R, 174/107; 524/505; 525/88, 192
See application file for complete search history.

(56) References Cited

U.S. PATENT DOCUMENTS

| | | | | |
|---|---|---|---|---|
| 4,259,410 A | * | 3/1981 | Dittmann et al. | 428/461 |
| 4,770,902 A | * | 9/1988 | Barlow et al. | 427/117 |

(Continued)

FOREIGN PATENT DOCUMENTS

| | | |
|---|---|---|
| JP | 5-78533 A | 3/1993 |
| JP | 08-283506 A | 10/1996 |

(Continued)

OTHER PUBLICATIONS

Machine Translation of JP 2008-063458 A. Nishiguchi et al., Flame-Retardant Resin Composition, Molded Article; Mar. 21, 2008.*

(Continued)

*Primary Examiner* — Timothy Thompson
*Assistant Examiner* — Sherman Ng
(74) *Attorney, Agent, or Firm* — Sughrue Mion, PLLC

(57) ABSTRACT

A covered conductor for wire harnesses, having a covering layer composed of a covering resin composition obtained by blending from 50 to 100 parts by weight of a metal hydrate and from 1 to 5 parts by weight of an external lubricant with 100 parts by weight of a base resin composition comprising from 50 to 75 parts by weight of a polypropylene-based resin, from 20 to 40 parts by weight of a propylene-α-olefin copolymer and the balance of a low-density polyethylene.

6 Claims, 1 Drawing Sheet

(56) References Cited

U.S. PATENT DOCUMENTS

| | | | |
|---|---|---|---|
| 4,871,787 A * | 10/1989 | Yamamoto et al. | 523/122 |
| 6,635,697 B2 * | 10/2003 | Kuwaki et al. | 524/100 |
| 7,201,970 B2 | 4/2007 | Kanamori et al. | |
| 2001/0031355 A1 * | 10/2001 | Nakagawa et al. | 428/355 AC |
| 2002/0043391 A1 * | 4/2002 | Suzuki et al. | 174/120 R |
| 2004/0168820 A1 * | 9/2004 | Kanamori et al. | 174/110 R |
| 2005/0171263 A1 * | 8/2005 | Kanamori et al. | 524/430 |
| 2007/0048524 A1 * | 3/2007 | Hase | 428/375 |
| 2007/0135576 A1 * | 6/2007 | Ono | 525/192 |
| 2007/0246243 A1 * | 10/2007 | Morioka et al. | 174/110 SR |

FOREIGN PATENT DOCUMENTS

| | | |
|---|---|---|
| JP | 08-283507 A | 10/1996 |
| JP | 2003-313377 A | 11/2003 |
| JP | 2004-75936 A | 3/2004 |
| JP | 2005-325153 A | 11/2005 |
| JP | 2007-056204 A | 3/2007 |
| JP | 2007-176981 A | 7/2007 |
| JP | 2008-63458 A | 3/2008 |

OTHER PUBLICATIONS

Communication dated Nov. 8, 2011 from the State Intellectual Property Office of P.R. China, issued in counterpart Chinese Application No. 200980121418.5.

International Search Report, dated Jul. 14, 2009, issued in Application No. PCT/JP2009/060557.

Office Action issued Apr. 23, 2013 by the Japanese Patent Office in corresponding Japanese Patent Application No. 2008-150579.

Office Action dated Jan. 29, 2013 issued by the Japanese Patent Office in counterpart Japanese Patent Application No. 2008-150579.

Communication dated Jul. 8, 2014 from the State Intellectual Property Office of P.R. China in a counterpart application no. 200980121418.5.

* cited by examiner

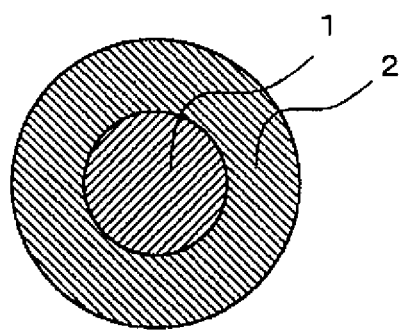

COVERED CONDUCTOR FOR WIRE HARNESS AND WIRE HARNESS PRODUCED USING THE SAME

TECHNICAL FIELD

The present invention relates to a covered conductor for wire harnesses of automobiles and the like, and a wire harness.

BACKGROUND ART

A wire harness composed of a plurality of electric wires is routed, for example, to supply an electric power to a device provided in each part of an automobile or exchange signals between respective devices.

The wire harness is required to be flexible in the routing operation or previous handling, but sufficient flexibility is not obtained at present. In particular, with an increase in the number of electric wires, the handleability is decreased and the flexibility becomes low.

Furthermore, in the case of a non-halogen covered conductor that is a flame retardant covered conductor free from production of a chlorine-based compound even during combustion (see, for example, Patent Document 1), as compared with the conventional covered conductor having a covering layer composed of a vinyl chloride resin composition, flexibility can be hardly obtained despite use of a resin composition having the same flexibility.

At first, the present inventors made studies to enhance the flexibility by decreasing the abrasion resistance which is originally necessary as an automotive electric wire, but even though flexibility of each electric wire was enhanced, sufficient flexibility as a wire harness could not be obtained.

CITATION LIST

[Patent Document 1] Japanese Patent Publication Number 2003-313377

SUMMARY OF THE INVENTION

Problems to be Solved

An object of the present invention is to improve the above-described conventional problems, that is, to provide a covered conductor for wire harnesses, which can maintain, as an automotive electric wire, adequate flame retardance and mechanical properties and ensure sufficient abrasion resistance and at the same time, when constituting a wire harness, enables obtaining abundant flexibility, and a flexible wire harness.

Means for Solving the Problems

As a result of intensive investigations, the present inventors have found that the flexibility as a wire harness is dependent on the friction between covering layers of electric wires rather than being dependent on the flexibility of the resin composition constituting the covering layer. The present invention has been accomplished based on this finding.

That is, the covered conductor for wire harnesses as a first aspect of the present invention is a covered conductor for wire harnesses, having a covering layer composed of a covering resin composition obtained by blending from 50 to 100 parts by weight of a metal hydrate and from 1 to 5 parts by weight of an external lubricant with 100 parts by weight of a base resin composition comprising from 50 to 75 parts by weight of a polypropylene-based resin, from 20 to 40 parts by weight of a propylene-α-olefin copolymer, and the balance, that is, from 5 to 10 parts by weight, of a low-density polyethylene.

The covered conductor for wire harnesses as a second aspect of the present invention is the covered conductor for wire harnesses as the first aspect of the present invention, wherein the external lubricant is one or more members selected from polyethylene wax, silicone oil and hydroxystearic acid.

The covered conductor for wire harnesses as a third aspect of the present invention is the covered conductor for wire harnesses, wherein the covering layer is the outermost layer.

The covered conductor for wire harnesses as a fourth aspect of the present invention is the covered conductor for wire harnesses, wherein the metal hydrate is one or more members selected from magnesium hydroxide and aluminum hydroxide.

A fifth aspect of the present invention is a wire harness produced using the covered conductor for wire harnesses as the first aspect.

Advantage of the Invention

The covered conductor for wire harnesses of the present invention is a covered conductor for wire harnesses, which does not generate a harmful chlorine-based compound even during combustion, can maintain, as an automotive electric wire, adequate mechanical properties (tensile elongation, flexibility) and ensure sufficient abrasion resistance and at the same time, when constituting a wire harness, enables obtaining abundant flexibility.

The wire harness of the present invention is flexible and therefore, this is an excellent wire harness whose handling or routing operation is facilitated.

BRIEF DESCRIPTION OF THE DRAWINGS

[FIG. 1] A cross-sectional view showing an exemplary model of the covered conductor for wire harnesses according to the present invention.

MODE FOR CARRYING OUT THE INVENTION

As described above, the covered conductor for wire harnesses of the present invention is a covered conductor for wire harnesses, having an outermost layer composed of a covering resin composition obtained by blending from 50 to 100 parts by weight of a metal hydrate and from 1 to 5 parts by weight of an external lubricant with 100 parts by weight of a base resin composition comprising from 50 to 75 parts by weight of a polypropylene-based resin, from 20 to 40 parts by weight of a propylene-α-olefin copolymer, and the balance of a low-density polyethylene.

Examples of the propylene-α-olefin copolymer include a propylene-ethylene random copolymer, a propylene-butene random copolymer and a propylene-ethylene-butene random copolymer, and these may be used as a single copolymer or by selecting and mixing two or more thereof.

The polyethylene needs to be a low-density polyethylene and if a medium-density polyethylene or a high-density polyethylene is used, abrasion resistance required for use as an automotive low-voltage electric wire cannot be obtained.

The base resin composition needs to comprise from 50 to 75 parts by weight of a polypropylene-based resin, from 20 to 40 parts by weight of a propylene-α-olefin copolymer, and the balance of a low-density polyethylene, in 100 parts by weight of the composition. If the composition is outside this range, sufficient abrasion resistance and flexibility cannot be obtained.

A metal hydrate is blended to account for from 50 to 100 parts by weight per 100 parts by weight of the base resin composition. If the proportion of the metal hydrate is less than 50 parts by weight, sufficient flame retardance is not obtained, whereas if the proportion is 100 parts by weight, adequate mechanical properties (tensile elongation, flexibility, abrasion resistance) are not obtained.

Examples of the metal hydrate for use in the present invention include magnesium hydroxide and aluminum hydroxide. One or more kinds of these metal halides are selected, but magnesium hydroxide is preferred because of its good flame retardance-imparting property.

Also, an external lubricant is blended to account for from 1 to 5 parts by weight per 100 parts by weight of the base resin composition. Thanks to blending of an external lubricant within such a range, friction between covering layers of electric wires can be reduced, so that when a wire harness is made up, a flexible wire harness can be obtained. In particular, the blending amount of the external lubricant is preferably from 1 to 5 parts by weight.

Examples of the external lubricant include polyethylene wax, silicone oil and hydroxystearic acid. One or more members thereof are selected, but polyethylene wax is preferred because of its high affinity for the base resin composition.

These raw materials are uniformly kneaded using, for example, a twin-screw extruder, a pressure kneader, a Banbury mixer or an open roll to obtain an electric wire-covering resin composition. In this respect, a metal hydrate and an external lubricant may be added to a previously produced base resin composition, or all raw materials may be blended and mixed at the same time.

The thus-obtained electric wire-covering resin composition may be directly used for electric wire covering or may be once pelletized by extrusion molding and then used for electric wire covering.

The entire electric wire-covering layer may be formed of the above-described electric wire-covering resin composition, or after forming a plurality of layers for the electric wire-covering layer, the outermost layer may be formed using the above-described electric wire-covering resin composition.

This electric wire-covering resin composition can be used for electric wire covering by extrusion molding similarly to the normal resin composition, and the resulting covered conductor for wire harnesses can be used for the production of a wire harness in the same manner as the normal covered conductor.

At this time, the covered conductor for wire harnesses of the present invention need not be necessarily used for all electric wires, and such a case is also included in the present invention. For example, when 50% or more of electric wires used are the covered conductor of the present invention, a flexible wire harness can be obtained, though this may vary depending on the number and kind (e.g., thickness) of electric wires used.

FIG. 1 is a cross-sectional view showing a model of the covered conductor according to Examples. In FIG. 1, numeral 1 is a core wire, and a covering resin layer 2 is arranged in the periphery thereof.

EXAMPLES

The covered conductor for wire harnesses of the present invention is specifically described below by referring to Examples.

Compounds 1 to 5 shown in Table 1 were used and blended in the ratio (parts by weight) shown in Tables 2 and 3, and the blend was uniformly kneaded by a twin-screw extruder to obtain Electric Wire-Covering Resin Compositions 1 to 10 of Examples and Electric Wire-Covering Resin Compositions 1 to 7 of Comparative Examples.

TABLE 1

| Compound 1 | polypropylene resin | EA9, produced by Japan Polypropylene Corp. |
|---|---|---|
| Compound 2 | propylene-α-olefin copolymer | Q200F, produced by Sun Allomer Ltd. |
| Compound 3 | low-density polyethylene | ZE41K, produced by Japan Polyethylene Corp. |
| Compound 4 | metal hydrate | Magnesium Hydroxide KISUMA-5, produced by Kyowa Chemical Industry Co., Ltd. |
| Compound 5 | external lubricant | Mitsui Hi-WAX 200P, produced by Mitsui Chemicals, Inc. |

These 17 kinds of electric wire-covering resin compositions were evaluated for tensile elongation and flexibility.

More specifically, with respect to the tensile elongation, measurement was performed by the test method in accordance with JIS K7161, and the tensile elongation was judged as sufficient and rated "A" when the measurement result was 500% or more, and judged as insufficient and rated "B" when less than 500%.

With respect to the flexibility, the sample was held on a jig for supporting two points by adjusting the distance therebetween to 50 mm, and the maximum load when pushing the center part of the sample at a constant rate by a push-pull gauge was measured. The flexibility was judged as sufficient and rated "A" when the load was less than 0.5 N, and judged as insufficient and rated "B" when 0.5 N or more.

Also, using these 17 kinds of electric wire-covering resin compositions, that is, Electric Wire-Covering Resin Compositions 1 to 10 of Examples and Electric Wire-Covering Resin Compositions 1 to 7 of Comparative Examples, covered conductors were produced. More specifically, 17 kinds of 1.2 mm-thick covered conductors, that is, Covered Conductors 1 to 10 of Examples and Covered Conductors 1 to 7 of Comparative Examples, each having a covering layer composed of the resin composition above and formed by extrusion molding in the periphery of a 0.7 mm-diameter core wire consisting of 7 wires, were obtained.

These covered conductors were evaluated for the abrasion resistance, flame retardance and surface frictional resistance.

The abrasion resistance was evaluated using a scrape abrasion tester in accordance with ISO6722. The abrasion resistance was judged as sufficient and rated "A" when the scrape abrasion number is 100 or more, and judges as insufficient and rated "B" when less than 100.

With respect to the flame retardance, the measurement was performed by the test method in accordance with ISO6722, and the flame retardance was judged as sufficient and rated "A" when the fire was extinguished in less than 70 seconds, and judged as insufficient and rated "B" when the fire spread for 70 seconds or more.

With respect to the surface frictional resistance, two covered conductors formed using the same resin were crosswise intersected at angles of 90°, the resistance when samples were fractioned with each other while applying a load of 300 gf (2.94 N) to the cross-point was measured by a push-pull gauge, and the surface frictional resistance was judged as sufficient and rated "A" when the result was less than 15 N, and judged as insufficient and rated "B" when 15 N or more.

Furthermore, by envisaging the production of a wire harness from each of the covered conductors above, the flexibility at the gathering and bundling was evaluated. Specifically, 30 covered conductors were gathered into one bundle and temporarily joined with a pressure-sensitive adhesive tape to prepare a sample. The sample was held on a jig for supporting two points by adjusting the distance therebetween to 100 mm, and the maximum load when pushing the center part of the sample at a constant rate by a push-pull gauge was measured. The flexibility was judged as sufficient and rated "A" when the load was less than 10 N, and judged as insufficient and rated "B" when 10 N or more. Here, 10 N is considered to be the upper limit to allow for bending of the electric wire bundle in the vicinity of connection part to a connector when the wire harness is actually routed in an automobile or the like. These evaluation results are shown together in Tables 2 and 3.

TABLE 2

| Example | 1 | 2 | 3 | 4 | 5 | 6 | 7 | 8 | 9 | 10 |
|---|---|---|---|---|---|---|---|---|---|---|
| Compound 1 | 50 | 62 | 72 | 50 | 62 | 75 | 62 | 62 | 62 | 62 |
| Compound 2 | 40 | 30 | 20 | 40 | 30 | 20 | 30 | 30 | 30 | 30 |
| Compound 3 | 10 | 8 | 8 | 5 | 10 | 5 | 8 | 8 | 8 | 8 |
| Compound 4 | 75 | 75 | 75 | 75 | 75 | 75 | 50 | 50 | 100 | 100 |
| Compound 5 | 1 | 1 | 1 | 5 | 5 | 5 | 1 | 5 | 1 | 5 |
| Tensile elongation | A | A | A | A | A | A | A | A | A | A |
| Flame retardance | A | A | A | A | A | A | A | A | A | A |
| Abrasion resistance | A | A | A | A | A | A | A | A | A | A |
| Flexibility | A | A | A | A | A | A | A | A | A | A |
| Surface Frictional Resistance | A | A | A | A | A | A | A | A | A | A |
| Flexibility as Wire Harness | A | A | A | A | A | A | A | A | A | A |

TABLE 3

| Comparative Example | 1 | 2 | 3 | 4 | 5 | 6 | 7 |
|---|---|---|---|---|---|---|---|
| Compound 1 | 62 | 62 | 62 | 45 | 80 | 62 | 62 |
| Compound 2 | 30 | 30 | 30 | 45 | 15 | 30 | 30 |
| Compound 3 | 8 | 8 | 8 | 10 | 5 | 8 | 8 |
| Compound 4 | 75 | 75 | 75 | 75 | 75 | 30 | 120 |
| Compound 5 | 0 | 0.5 | 15 | 3 | 3 | 3 | 3 |
| Tensile elongation | A | A | A | A | A | A | A |
| Flame retardance | A | A | A | A | A | B | A |
| Abrasion resistance | A | A | B | B | A | A | B |
| Flexibility | A | A | A | A | B | A | B |
| Surface Frictional Resistance | B | B | A | A | A | A | A |
| Flexibility as Wire Harness | B | B | A | A | B | A | A |

It is understood from Tables 2 and 3 that the covered conductor for wire harnesses of the present invention is an excellent covered conductor for wire harnesses, which can maintain, as an automotive electric wire, adequate flame retardance and mechanical properties and ensure sufficient abrasion resistance and at the same time, when constituting a wire harness, enables obtaining abundant flexibility.

The present invention can be of course carried out by making various changes within the purport of the invention. While the invention has been described in detail and with reference to specific embodiments thereof, it will be apparent to one skilled in the art that various changes and modifications can be made therein without departing from the spirit, scope and intention of the invention.

This application is based on Japanese Patent Application (Patent Application No. 2008-150579) filed on Jun. 9, 2008, the contents of which are incorporated herein by way of reference.

INDUSTRIAL APPLICABILITY

According to the present invention, an excellent covered conductor for wire harnesses, which does not generate a harmful chlorine-based compound during combustion, can maintain, as an automotive electric wire, adequate mechanical properties (tensile elongation, flexibility) and ensure sufficient abrasion resistance and at the same time, when constituting a wire harness, enables obtaining abundant flexibility, can be obtained.

| DESCRIPTION OF REFERENCE NUMERALS AND SIGNS | |
|---|---|
| 1 | Core wire |
| 2 | Covering resin layer |

The invention claimed is:

1. A covered conductor for an automotive wire harness, the covered conductor having a covering layer composed of a covering resin composition obtained by blending from 50 to 100 parts by weight of a metal hydrate and from 1 to 5 parts by weight of an external lubricant with 100 parts by weight of a base resin composition comprising from 50 to 75 parts by weight of a polypropylene-based resin, from 20 to 40 parts by weight of a propylene-α-olefin copolymer, and the balance of a low-density polyethylene, wherein said external lubricant is polyethylene wax,
wherein the covered conductor is a plurality of covered conductors, the plurality of covered conductors being bundled into the automotive wire harness, a surface frictional resistance between adjacent ones of the covering layers is less than 15 N, as measured by a push-pull gauge, when two covered conductors formed using the same resin are cross-wise intersected at angles of 90 degrees, while applying a load of 300 gf (2.94 N) to a cross-point of the intersected covered conductors.

2. The covered conductor for automotive wire harnesses as claimed in claim 1, wherein said covering layer is the outermost layer.

3. A wire harness produced using the covered conductor for automotive wire harnesses claimed in claim 1.

4. The covered conductor for automotive wire harnesses as claimed in claim 1, wherein the propylene-α-olefin copolymer includes one of propylene-butene random copolymer and propylene-ethylene-butene random copolymer.

5. The covered conductor for automotive wire harnesses as claimed in claim 1, wherein the propylene-α-olefin copolymer includes propylene-ethylene-butene random copolymer.

6. The covered conductor for automotive wire harnesses as claimed in claim 1, wherein the propylene-α-olefin copolymer includes propylene-ethylene random copolymer.

* * * * *